2,941,009
Patented June 14, 1960

2,941,009
PREPARATION OF ETHERS OF VITAMIN A ALCOHOL

Leonard Weisler and James G. Baxter, Rochester, N.Y., assignors to Eastman Kodak Company, Rochester, N.Y., a corporation of New Jersey No Drawing. Filed May 5, 1958, Ser. No. 732,833

3 Claims. (Cl. 260—611)

The present invention concerns the preparation of ethers of vitamin A alcohol, and more particularly, lower alkyl ethers of vitamin A alcohol.

Ethers of vitamin A alcohol are well-known vitamin A-active materials which possess desirable properties, especially with respect to the stability of aqueous dispersions thereof. Previous methods for preparing these materials involved laborious procedures, were low yielding or required undesirably long reaction periods.

It is an object of this invention to provide an improved method for preparing ethers of vitamin A alcohol.

It is another object of this invention to provide a novel method for preparing lower alkyl ethers of vitamin A alcohol, which method facilitates the preparation of such ethers in high yields with relatively short reaction times.

It is an additional object of the invention to provide a new method for preparing the methyl ether of vitamin A alcohol.

These and other objects of the invention are accomplished by reacting vitamin A alcohol and a lower alkyl iodide in the presence of an alkali metal hydroxide.

The lower alkyl ethers of vitamin A alcohol prepared in accordance with the invention have the following structural formula:

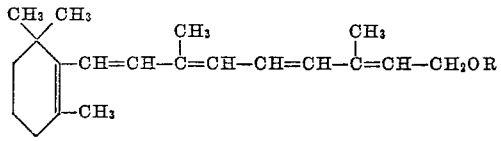

wherein R is an alkyl radical containing 1–4 carbon atoms.

The vitamin A alcohol used in the present novel process is a well-known compound in the vitamin art and it can be prepared synthetically or it can be prepared from natural sources. Vitamin A alcohol is commonly called simply "vitamin A" or "axerophthol."

A lower alkyl iodide is one of the reactants in the subject process. The preferred reactant is methyl iodide, although other suitable lower alkyl iodides containing 1 to 4 carbons include such compounds as ethyl iodide, propyl iodide and butyl iodide. In the present process, one molar proportion of vitamin A alcohol reacts with one molar proportion of the lower alkyl iodide. As vitamin A alcohol is the more expensive reactant it is preferred to employ a stoichiometric excess of the lower alkyl iodide.

Any alkali metal hydroxide can be employed in the present reaction, such as sodium hydroxide, potassium hydroxide and the like. Suitably at least one mole of the alkali metal hydroxide is used for each mole of vitamin A alcohol used.

In carrying out the invention, the vitamin A alcohol and the lower alkyl iodide are reacted in the presence of the alkali metal hydroxide in an organic solvent. Suitable solvents include acetone, methyl ethyl ketone, diethyl ether, isopropyl ether, di-n-butyl ether, benzene and related organic solvents that are substantially inert to the reactants. The resulting reaction mixture is thereafter allowed to react at an elevated temperature. While the reaction temperature can be widely varied, more usually the reflux temperature of the solvent is employed. Reaction temperatures of about 30–125° C., and preferably 35–100° C., are used. The reaction is allowed to proceed to completion. As the more expensive vitamin A alcohol is usually the limiting reactant, stoichiometrically, the reaction is carried out until substantially all of the vitamin A alcohol has been consumed in the subject process. A significant feature of the present process is that the reaction can be effected in relatively short reaction times, with reaction times of 15–30 minutes or up to 45 minutes being commonly used.

The resulting reaction products can be worked-up or purified in accordance with usual practice. Typically, the reaction product is extracted with a solvent for the lower alkyl ether of vitamin A alcohol, dried and the solvent removed by vacuum distillation. High yields characterize the subject process, with yields in excess of 90% being commonly obtained.

Lower alkyl ethers of vitamin A alcohol have vitamin A activity and have particular utility in aqueous vitamin dispersions. Such emulsifying agents as polyoxyalkylene sorbitan monooleate ("Tween 80", manufactured by Atlas Powder Company) can be employed to prepare aqueous dispersions of the subject ethers. Other fat-soluble vitamins such as vitamin D and tocopherols, as well as such water-soluble vitamins as vitamin $B_1$, vitamin $B_2$, vitamin C and others, can be combined with lower alkyl ethers of vitamin A alcohol in aqueous dispersions. Usually the pH of the aqueous phase of such dispersions is adjusted to a pH of about 5 by the addition of bases such as diethanolamine. Lower alkyl ethers of vitamin A alcohol in such dispersions have good stability to oxidative destruction. The methyl ether of vitamin A alcohol is the preferred ether of vitamin A used in aqueous vitamin dispersions.

The invention is further illustrated by the following example of a preferred embodiment thereof.

Example

A 2.86 g. sample of synthetic vitamin A alcohol $$E_{1\ cm.}^{1\%} (325\ m\mu) = 1400$$

was dissolved in 30 ml. of acetone. To this solution were added 5 g. of methyl iodide and 2.2 g. of finely pulverized potassium hydroxide. The resulting mixture was refluxed for 25 minutes with constant stirring. Then the reaction product was extracted with diethyl ether and the diethyl ether extract washed to neutrality with water and dried over sodium sulfate. Thereafter the diethyl ether was removed by vacuum distillation to yield 3.05 g. of the methyl ether of vitamin A alcohol having $$E_{1\ cm.}^{1\%} (326\ m\mu) = 1280$$

for a yield of approximately 93%. Similar high yields were obtained by employing sodium hydroxide in lieu of potassium hydroxide, and, benzene and isopropyl ether in lieu of the acetone solvent in the described reaction for preparing the methyl ether of vitamin A. When potassium carbonate was employed in lieu of potassium hydroxide in the reaction, a yield of only 10% of the methyl ether of vitamin A was obtained.

The present invention thus provides an improved method for preparing lower alkyl ethers of vitamin A alcohol. The process of the invention is particularly useful as it facilitates the preparation of lower alkyl ethers of vitamin A alcohol in high yields with relatively short reaction times.

Although the invention has been described in detail with particular reference to certain typical embodiments, it will be understood that variations and modifications can be effected within the spirit and scope of the invention as described hereinabove and as defined in the appended claims.

We claim:

1. The process for preparing a lower alkyl ether of vitamin A alcohol which comprises reacting at an elevated temperature of about 30–125° C. vitamin A alcohol and a lower alkyl iodide wherein the alkyl group has 1 to 4 carbon atoms in the presence of an alkali metal hydroxide in an organic solvent substantially inert to the said reactants, at least one mole of said lower alkyl iodide and alkali metal hydroxide being employed for each mole of vitamin A alcohol in the said reaction.

2. The process for preparing the methyl ether of vitamin A alcohol which comprises reacting at a temperature of about 30–125° C. vitamin A alcohol and methyl iodide in the presence of an alkali metal hydroxide in an organic solvent substantially inert to the said reactants, at least one mole of methyl iodide and alkali metal hydroxide being employed for each mole of vitamin A alcohol in the said reaction.

3. The process which comprises refluxing at an elevated temperature vitamin A alcohol, methyl iodide and potassium hydroxide in acetone, whereby the vitamin A alcohol is converted to the methyl ether of vitamin A alcohol, at least one mole of methyl iodide and potassium hydroxide being employed for each mole of vitamin A alcohol in the said reaction.

References Cited in the file of this patent

UNITED STATES PATENTS

| | | |
|---|---|---|
| 2,430,493 | Cawley | Nov. 11, 1947 |
| 2,452,386 | Milas | Oct. 26, 1948 |